(12) United States Patent
Walker

(10) Patent No.: US 6,179,740 B1
(45) Date of Patent: Jan. 30, 2001

(54) DUAL-ADJUSTABLE BELT IDLER

(75) Inventor: Howard F. Walker, Toppenish, WA (US)

(73) Assignee: Moxee Innovations Corporation, Moxee, WA (US)

(*) Notice: Under 35 U.S.C. 154(b), the term of this patent shall be extended for 0 days.

(21) Appl. No.: 09/324,993

(22) Filed: Jun. 2, 1999

(51) Int. Cl.⁷ .......................................... F16H 7/12
(52) U.S. Cl. ............................................. 474/134
(58) Field of Search .................... 474/111, 134, 474/138, 88

(56) References Cited

U.S. PATENT DOCUMENTS

| 68,625 | 9/1867 | Hawley . | |
|---|---|---|---|
| 1,338,405 | 4/1920 | Stickney . | |
| 1,499,920 | 7/1924 | Godden . | |
| 2,897,683 | 8/1959 | Carver . | |
| 3,313,168 | 4/1967 | Matthews . | |
| 3,575,058 | 4/1971 | Kraus . | |
| 3,630,096 | 12/1971 | Brewer . | |
| 3,646,784 | * 3/1972 | Zarrello ..................................... | 68/20 |
| 3,926,063 | 12/1975 | Mayfield . | |
| 3,941,006 | 3/1976 | Brodesser . | |
| 4,068,535 | 1/1978 | Sheets . | |
| 4,420,359 | * 12/1983 | Goldsworthy ...................... | 156/379.8 |
| 4,479,660 | * 10/1984 | Pattison ............................. | 474/134 X |
| 4,662,862 | 5/1987 | Matson . | |
| 4,798,562 | 1/1989 | Matson et al. . | |
| 4,850,934 | 7/1989 | Gibson, Jr. et al. . | |
| 4,892,508 | 1/1990 | Ryan et al. . | |
| 5,000,724 | 3/1991 | Reid . | |
| 5,221,236 | * 6/1993 | Raymer et al. .................. | 474/134 X |
| 5,457,967 | 10/1995 | Scherzinger . | |
| 5,938,551 | * 8/1999 | Warner ................................. | 474/111 |

FOREIGN PATENT DOCUMENTS 2 092 705    8/1982  (GB) .

* cited by examiner

Primary Examiner—Dirk Wright
(74) Attorney, Agent, or Firm—Christensen O'Connor Johnson Kindness PLLC

(57) ABSTRACT

A tensioning device (10) for a conventional drive system, which includes pulleys (not shown) interconnected by a flexible drive element (12), includes a frame assembly (20), upper left and right contact rollers (22) and (24), and lower left and right contact rollers (26) and (28). The frame assembly (20) includes proximal and distal frame sidewalls (38) and (40) which are rectangular in shape. Each contact roller (22), (24), (26), and (28) engages the flexible drive element (12) and forms a U-shaped channel (30) with a bottom circumferential surface (22) and vertical sidewalls (34). The contact rollers (22), (24), (26), and (28) rotatably attach to bearing axles (72), (74), (76), and (78) which connect the contact rollers to the frame sidewalls through their respective positional locating apertures (42), (44), (46), and (48). The bearing axles of the contact rollers can also be selectively secured to the frame sidewalls through horizontal adjustment apertures (52), (54), (56), and (58) to adjustably secure the upper contact rollers (22) and (24) a selected distance from one another, and adjustably secure the lower contact rollers (26) and (28) a selected distance from one another, thereby optimizing the locations in which the tensioning device (10) applies biasing force to the drive belt (12). The bearing axles (72), (74), (76), and (78) of the contact rollers (22), (24), (26), and (28) can also be connected to the frame sidewalls (38) and (40) through the vertical adjustment apertures (62), (64), (66), and (68) to adjustably secure the upper contact rollers (22) and (24) a selected distance from the lower rollers (26) and (28), thereby adjusting the tensioning device (10) so as to apply a suitable tensioning force to the drive belt (12).

36 Claims, 6 Drawing Sheets

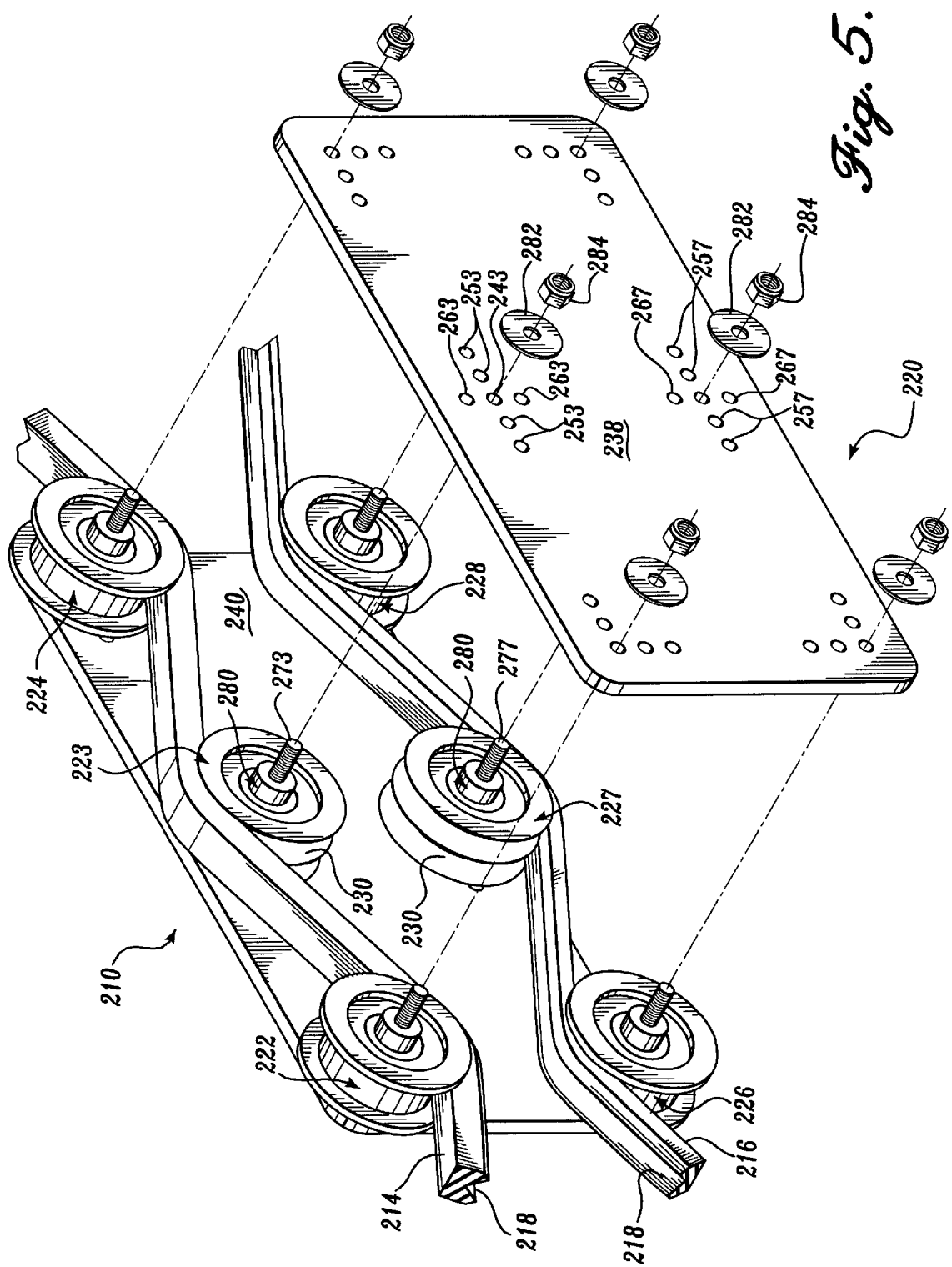

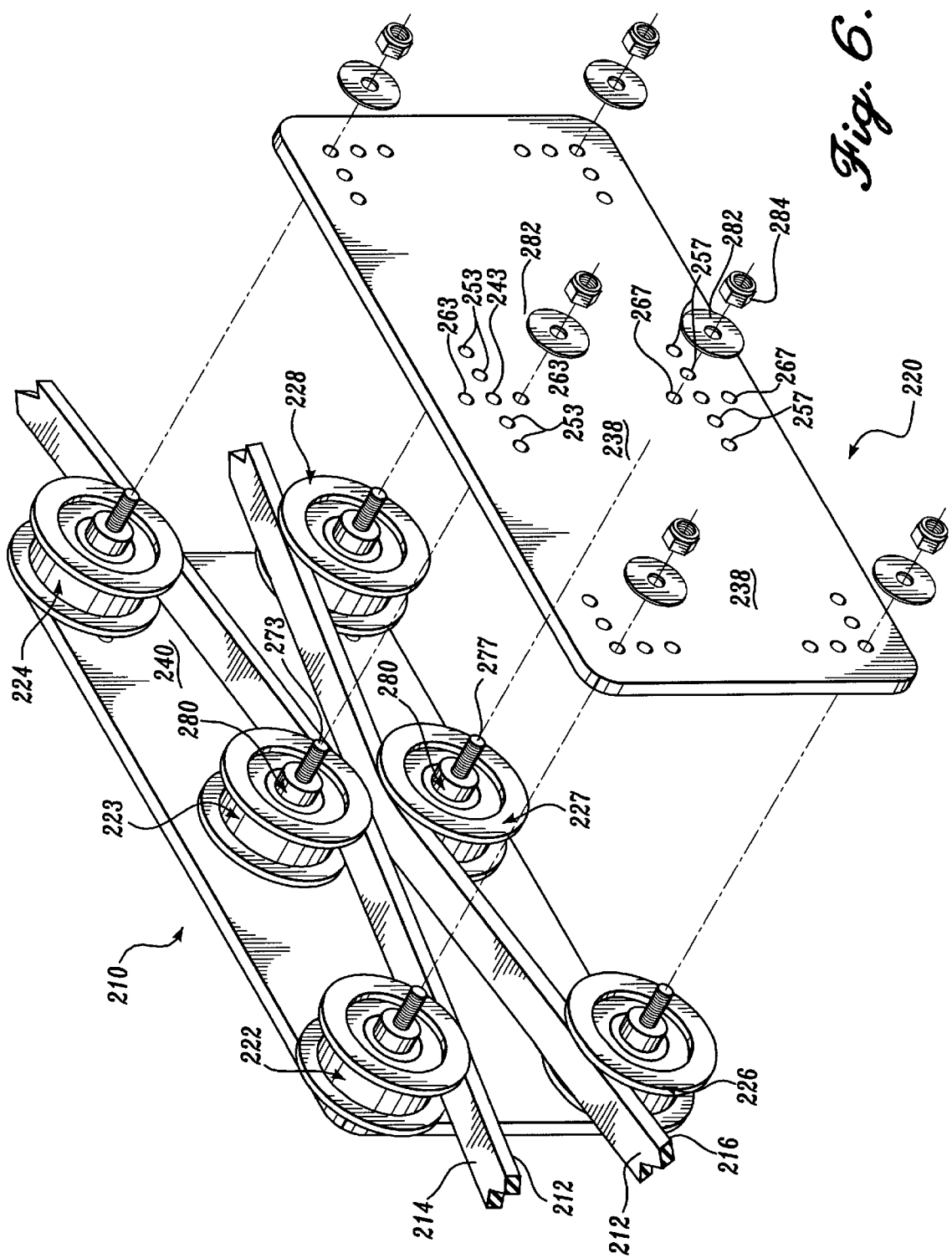

DUAL-ADJUSTABLE BELT IDLER

FIELD OF THE INVENTION

The present invention relates to tensioning devices for drive systems that include flexible drive elements such as drive belts, and more particularly to tensioning devices with enhanced stability features.

BACKGROUND OF THE INVENTION

The present invention is adapted for use with a conventional drive system in which a driven pulley and a drive pulley are connected by a flexible drive element such as a drive belt. In such an arrangement, it is well known that the proper functioning of the drive system and the operating life of the drive belt can be significantly enhanced by maintaining the two drive belt runs between the pulleys in tension such that significant slack does not occur in either run. One method of providing such tension is to resiliently bias the pulleys away from one another. However, a more convenient arrangement is provided by a tensioning device that biases one or both drive belt runs inwardly towards the other run at a point intermediate the pulleys. This arrangement provides the added advantage of keeping a greater surface area of the drive belt in contact with the outer surface of the pulleys at any given period of time. A number of examples of this latter type of tensioning device are disclosed in the prior art. However, in the great majority of prior tensioning devices, the tensioning device is adapted to operate in a particular drive system, e.g., to operate with a given arrangement of pulleys and drive belt.

One result of the fact that prior tensioning devices have been adapted for specific applications is that most such devices have been mounted or secured to a support that is fixed with respect to the pulley axles. Through use of such a support arrangement, the position of the tensioning device between the pulleys cannot be controlled, to maintain the tensioning device at the optimum position. The use of fixed supports has conventionally been viewed as especially important for tensioning devices adapted to operate with pulleys that are or may be horizontally positioned with respect to one another. In such a horizontal arrangement, the weight of the tensioning device does not affect its position, i.e., the position of the tensioning device between the pulleys is not in any way controlled by gravity acting on the tensioning device.

A further feature of the majority of prior art tensioning devices is that in such devices, the surfaces contacting the two runs of the drive belt and urging them inward are either fixed in position with respect to one another, or resiliently biased towards one another by springs or similar means. A disadvantage of the resilient biasing technique is that it adds complexity to the tensioning device, and the spring or other resilient means are themselves subject to wear over time. Tensioning devices having fixed distances between their contact surfaces cannot be adjusted as the belt experiences increased wear. Thus, the tensioning force provided by the device decreases over time, at least in those arrangements where the pulleys are horizontally positioned with respect to one another. A further disadvantage of a fixed distance between the contact surfaces is that the tensioning device cannot be used with different sized pulleys.

One attempt to overcome the drawbacks of the prior art has been provided by the belt tensioner disclosed in U.S. Pat. No. 4,068,535 to Sheets. This device utilizes upper and lower idler assemblies, each of which carries significantly longitudinally spaced rollers, which are adjustably connected by threaded rods. However, this device is not easily adjusted, due to the need to undo locking washers and nuts, and is not compact, due to the widely spaced rollers. Thus, this device is not well suited for use on drive belts which operate in closely confined spaces.

Additional partial solutions for tensioning drive mechanism tensioners are provided by the chain tensioners disclosed in U.S. Pat. No. 4,662,862 to Matson, U.S. Pat. No. 4,798,562 to Matson et al. and U.S. Pat. No. 4,850,934 to Gibson Jr. et al. These devices provide upper and lower low friction drive chain contact members that glide on chain surfaces, and which are incremented by adjustable straps. The straps are readily adjusted to change the spacing of the contact members, particularly in a disclosed ratcheting strap version. However, these devices, while well suited for use on chains, are not as well suited for use on belts due to the increased friction associated with belt contact on the contact members.

Further drawbacks of prior art tensioning devices stem from their lack of adjustability. As has been previously mentioned, it is advantageous to be able to adjust a tensioning device such that the surfaces of the tensioning device, which contact the two runs of a flexible drive element, can be positioned closer to one another. Additionally, in tensioning devices that contain more than one contact surface for each run of a flexible drive element, it is also advantageous to be able to position the contact surfaces on each side of the flexible drive element closer or further away from one another. It is a further benefit for a tensioning device to be of a configuration that adequately supports the contact surfaces in a stable arrangement. It is of still further benefit for a tensioning device to be able to manage multiple drive elements and relatively long drive elements, both of which have their own specific problems, such as the tendency for the runs to tangle with one another and/or to flip an associated tensioning device.

SUMMARY OF THE INVENTION

The present invention discloses a tensioning device for a drive system having at least one flexible drive element that includes at least first and second runs which extend between pulleys, wheels or the like. The tensioning device includes a first set of at least two contact rollers that engage a first run of the flexible drive element in order to assist in guiding the drive element. The tensioning device also includes a second set of at least two contact rollers that engage a second run of the flexible drive element in order to assist in guiding the drive element. Further, at least one connecting frame sidewall extends between the first and second set of contact rollers for securing the contact rollers a selected distance from one another, for adjustably securing the distance between the contact rollers of the first set, and for adjustably securing the distance between the contact rollers of the second set.

In a preferred embodiment of the present invention, two connecting frame sidewalls extends between the first and second set of contact rollers for adjustably securing the contact rollers a selected distance from one another to apply a predetermined tensioning force to the drive element. The contact rollers each rotatably engage the flexible drive element and include a U-shaped circumferential guide channel that forms sidewalls in the contact rollers to assist in guiding the drive element.

A preferred embodiment of a tensioning device constructed in accordance with the present invention utilizes connecting frame sidewalls that are substantially rectangular in shape. In this respect the tensioning device can be mounted with the longer leg of the rectangular frame sidewalls substantially aligned in parallel with the runs of the flexible drive element (horizontally-oriented), or with the shorter leg of the rectangular frame sidewalls substantially aligned in parallel with the runs of the flexible drive element (vertically-oriented). In another preferred embodiment of the present invention the connecting frame sidewalls are substantially square in shape. Further, as shown when viewed from the side, the connecting frame sidewalls of the present invention are substantially flat.

In another aspect of a preferred embodiment of the present invention, the frame sidewalls contains multiple positional locating apertures for each contact roller. The contact rollers are rotatably connected to the frame sidewalls by bearing axles that are secured through the positional locating apertures. The distance between the contact rollers is adjustable by selectively securing the bearing axles through the appropriate positional locating apertures that produce the desired spacing between the contact rollers. Preferably, the outer edges of the frame sidewalls are substantially aligned with the multiple positional locating apertures.

In a preferred embodiment of the present invention, the tensioning device includes additional sets of contact rollers that are configured to tension at least one more additional flexible drive element. While the additional sets of contact rollers are independently journalled from the first and second sets of contact rollers, the additional sets of contact rollers do share the same bearing axles as the first and second sets of contact rollers. Further, the contact rollers have angled surfaces that engage with the flexible drive element. Preferably, the additional sets of contact rollers also have angled surfaces that engage with the additional flexible drive element, such that the angled surfaces of the first and second sets of contact rollers are inversely juxtapositioned to the angled surfaces of the additional sets of contact rollers.

In still another preferred embodiment, at least one intermediate contact roller is secured to the connecting frame sidewalls approximately between the contact rollers of the first pair, that engages a first run of the flexible belt drive to assist in stabilizing the belt drive. Additionally, at least one intermediate contact roller is secured to the connecting frame sidewalls approximately between the contact rollers of the second pair that engages a second run of the flexible belt drive to assist in stabilizing the belt drive. In one embodiment, the intermediate contact rollers have surfaces that engage with the flexible drive element that are in a serrated configuration to correspondingly receive a belt drive with a saw tooth-shaped drive surface.

In yet another exemplary embodiment of the present invention, the tensioning device is free floating, supportable solely by a flexible drive belt. Further, the tensioning device preferably includes a frame assembly connecting a first and second set of at least two contact members in order to secure the first and second pair of contact members a selected distance from one. Additionally, the frame assembly also adjustably secures the distance between the contact members of the first pair, and adjustably secures the distance between the contact members of the second pair.

A tensioning device constructed in accordance with the present invention provides enhanced adjustability in tensioning of the flexible drive elements, and in particular drive belts, in a drive system without many of the limitations encountered by devices in the prior art. The present tensioning device is adjustable such that the contact rollers which engage each run of the flexible drive element can be positioned closer or further away from one another on each run of the flexible drive element.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 5 illustrates an exploded perspective view of another alternate dual-adjustable belt idler of the present invention that includes intermediate contact rollers and shows interwoven tensioning of a double-V drive belt; and FIG. 6 illustrates an exploded perspective view of the dual-adjustable belt idler of FIG. 5, and shows non-interwoven tensioning of a flat drive belt.

DETAILED DESCRIPTION OF THE PREFERRED EMBODIMENT

Figure 1:
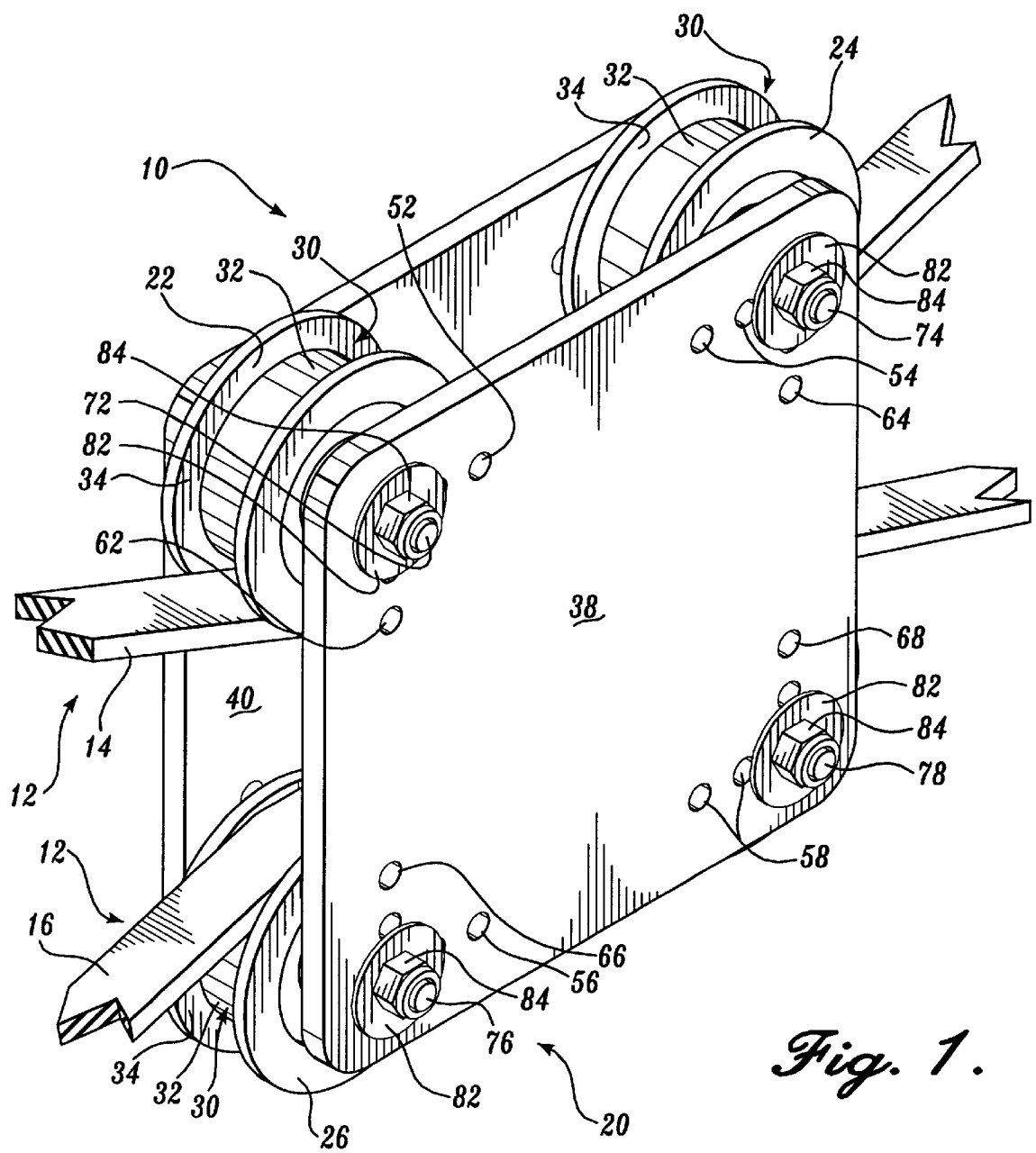
FIG. 1 illustrates an elevated perspective view of a dual-adjustable belt idler of the present invention, configured for use with a single belt.
Figure 2:
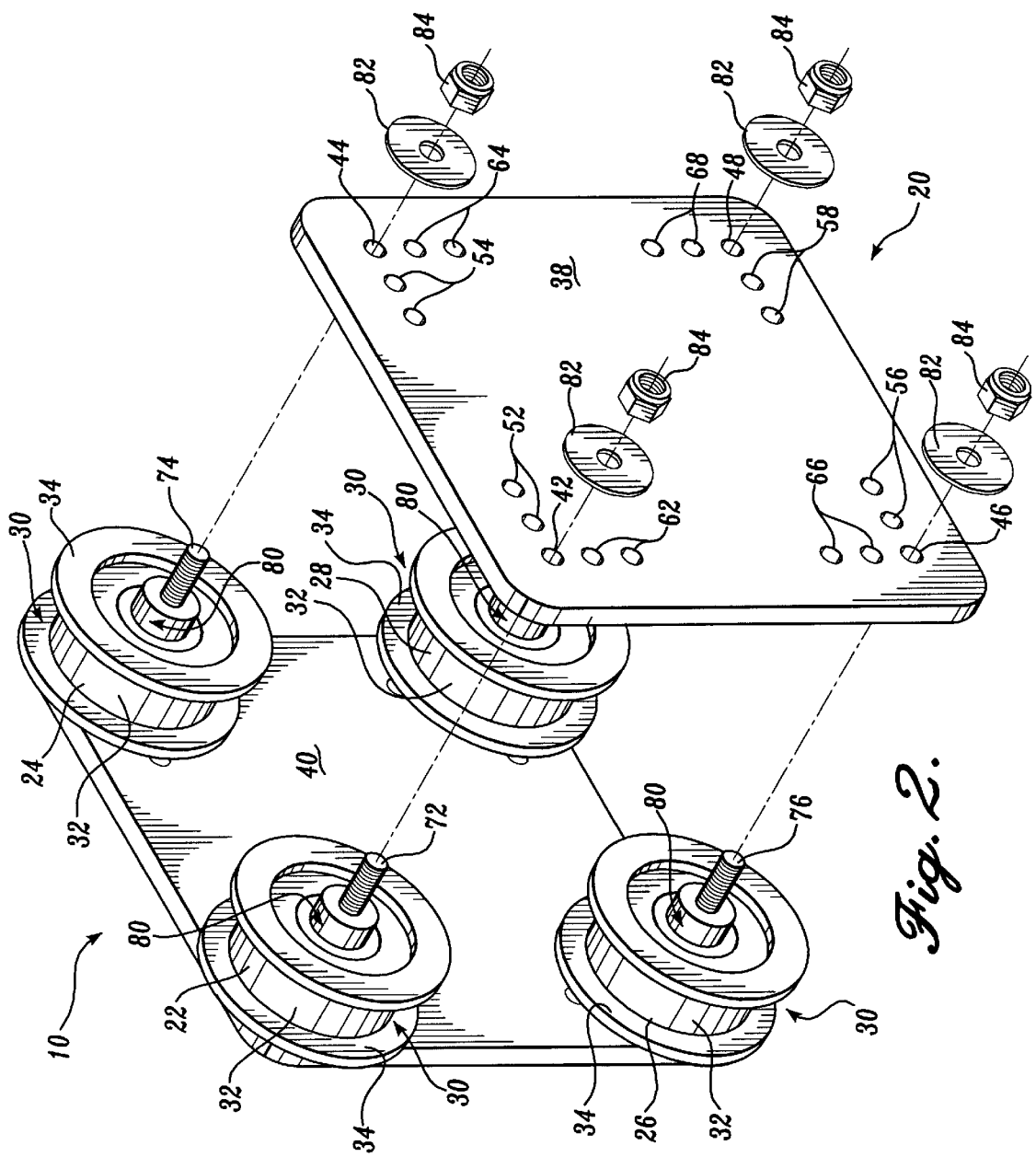
FIG. 2 illustrates an exploded perspective view of the dual-adjustable belt idler of FIG. 1.

FIGS. 1 and 2 illustrate a preferred embodiment of a tensioning device 10 constructed in accordance with the present invention used in conjunction with a conventional drive system that includes pulleys (not shown) interconnected by a flexible drive element 12 which is preferably a belt drive. Preferably, the tensioning device 10 includes a frame assembly 20, upper left and right contact rollers 22 and 24, and lower left and right contact rollers 26 and 28. The frame assembly 20 includes a proximal frame sidewall 38 and a distal frame sidewall 40, both of which are preferably rectangular (or square) in shape. The upper contact rollers 22 and 24, and the lower contact rollers 26 and 28, are configured to engage a drive surface of upper and lower runs of the flexible drive element 12, and form U-shaped channels 30 with bottom circumferential surfaces 22 and vertical sidewalls 34. The left and right upper contact rollers 22 and 24 are mounted on left and right bearing axles 72 and 74, and the left and right lower contact rollers 26 and 28 are mounted on left and right bearing axles 76 and 78, which connect the contact rollers 22, 24, 26, and 28 to the frame sidewalls 38 and 40, through their respective positional locating apertures 42, 44, 46, and 48, in the frame sidewalls. The flexible drive belt 12 includes an upper run 14 that is biased downwardly by the upper contact rollers 22 and 24, and a lower run 16 that is biased upwardly by the lower contact rollers 26 and 28.

The bearing axles 72, 74, 76, and 78, of the contact rollers 22, 24, 26, and 28 can also be selectively secured to the frame sidewalls 38 and 40 through horizontal adjustment apertures 52, 54, 56, and 58, to adjustably secure the upper contact rollers 22 and 24 a selected horizontal distance from one another and adjustably secure the lower contact rollers 26 and 28 a selected horizontal distance from one another (i.e., horizontal being defined as generally aligned with the longitudinal axis of each of the upper run 14 and lower run 16 of the drive belt 12), thereby optimizing the locations in which the tensioning device 10 applies biasing force to the drive belt 12. The bearing axles 72, 74, 76, and 78 of the contact rollers 22, 24, 26, and 28 can also be connected to the frame sidewalls 38 and 40 through the vertical adjustment apertures 62, 64, 66, and 68, to adjustably secure the upper contact rollers 22 and 24 a selected vertical distance from the lower rollers 26 and 28 (i.e., vertical being defined as generally perpendicular to the longitudinal axis of the upper run 14 and lower run 16 of the drive belt 12), thereby adjusting the tensioning device 10 so as to apply a suitable tensioning force to the drive belt 12.

As shown in FIG. 1, the tensioning device 10 is free floating, supported solely by the flexible drive element 12 that interconnects at least two pulleys (not shown). In one preferred embodiment, the flexible drive element 12 consists of a drive belt. The free floating tensioning device 10 locates between the pulleys (not shown), pushing the upper run 14 and the lower run 16 of the drive belt 12 towards one another. In this manner, slack is removed from the flexible drive belt 12, thereby decreasing belt wear and substantially reducing the possibility that the belt will dislodge from one or more of the pulleys.

As briefly mentioned, the outer circumference of the contact rollers 22, 24, 26, and 28 form U-shaped channels 30. In one preferred embodiment, the bottom surface 32 of each U-shaped channel 30 is configured to form a substantially flat cylindrical surface. The cylindrical surface 32 of each contact roller 22, 24, 26, and 28 is designed substantially flat in order to correspondingly engage with a flat surface of a belt drive 12. (Thus, if the tensioning device 10 was intended to be utilized in conjunction with a non-flat surfaced belt drive, such as a double-V belt (when viewed cross-sectionally), the cylindrical surfaces 32 and U-shaped channels 30 would be appropriately modified in order to correspondingly mate with the alternatively shaped drive element 12). The sidewalls 34 of the U-shaped channels 30 are approximately orthogonal to the bottom cylindrical surfaces 32 of the channels. The U-shaped channels 30 of the contact rollers 22, 24, 26, and 28 act to guide and center the belt drive 12 as it passes through the tensioning device 10. Preferably, however, the sidewalls 34 of the contact rollers 22, 24, 26, and 28, make infrequent contact with the upper run 14 and lower run 16 of the belt drive 12 (or ideally no contact) so that friction and drag between the belt drive 12 and the tensioning device 10 is minimized. Instead, the belt drive 12 preferably only contacts the cylindrical surface 32 of the contact rollers 22, 24, 26, and 28 (as shown in FIG. 1).

The upper and lower contact rollers 22, 24, 26, and 28 are each rotatably connected to their respective bearing axle 72, 74, 76, and 78, which are in turn statically connected to the frame sidewalls 38 and 40. Specifically, the contact rollers 22, 24, 26, and 28 connect to the bearing axles 72, 74, 76, and 78 by way of bearing race assemblies 80. Many different acceptable variations of bearing race assemblies are known in the art which can be sufficiently utilized for this purpose. As shown in FIGS. 1 and 2, the upper and lower contact roller bearing axles 72, 74, 76, and 78 nest in and project through the positional locating apertures 42, 44, 46, and 48 in the frame sidewalls 38 and 40, where the axles are selectively secured by washers 82 and nuts 84. Many other variations of selective securement mechanisms (which are known in the art) may be employed to adjustably connect the contact rollers 22, 24, 26, and 28 to the frame sidewalls 38 and 40 in place of or in addition to washers 82 and nuts 84, without departing from the scope of the present invention.

As previously stated, the frame assembly 20 is comprised of proximal and distal frame sidewalls 38 and 40 which are configured as flat planes and are substantially rectangular in shape (preferably with rounded corners as shown in FIGS. 1 and 2). The exact shape of the frame assembly 20, however, is not critical to the functioning of the tensioning device 10 and can be modified in many ways without departing from the scope of the present invention. For example, the sidewalls 38 and 40 could be square, parallelogram, oval, elliptical, circular, or many other shapes, as well as varying in surface profile. The frame assembly 20 could also utilize a single structure such as a U-shaped frame, or a multi-piece sidewalls without departing from the scope of the present invention. Further, in an embodiment of the present invention that utilizes rectangular frame sidewalls, the tensioning device 10 can either be mounted with the longer legs of the rectangular frame sidewalls being substantially aligned with the runs 14 and 16 of the drive belt 12 (horizontally-oriented), or mounted with the shorter legs of the rectangular frame sidewalls substantially aligned with the runs 14 and 16 of the flexible drive belt 12 (vertically-oriented). This ability of a preferred embodiment tensioning device 10 to be either horizontally or vertically mounted provides an additional adaptability feature for selecting the appropriate drive belt biasing tension, and positioning the application of the drive belt biasing tension for enhanced stability and belt life.

An important aspect of a preferred embodiment tensioning device 10 is the ability to be adaptable both in the amount of tension that is applied to a belt drive 12 and in the positioning of the locations in which the biasing force is imparted onto the drive belt 12. While some prior art devices have attempted to address the issue of adjustability with respect to the amount of tensioning force imparted onto the drive belt by the tensioning device 10, none have adequately addressed the need for simple and effective adjustability of the positional locations in which the biasing force is imparted onto the upper and lower runs 14 and 16 of a drive belt 12. Specifically, in a preferred embodiment tensioning device 10 of the present invention, this refers to the ability of the upper contact rollers 22 and 24 to be able to be adjustably secured closer and farther away from one another, and the ability of lower contact rollers 26 and 28 to be able to be adjustably secured closer and farther away from one another.

As most clearly shown in FIG. 2, the frame sidewalls 38 and 40 each contain primary positional locating apertures (upper left 42, upper right 44, upper left 46, and lower left 48) for receiving their respective contact roller bearing axles 72, 74, 76, and 78, as well as horizontal adjustment apertures 52, 54, 56, and 58, and vertical adjustment apertures 62, 64, 66, and 68, respectively. By simply selectively securing any or all of the bearing axles 72, 74, 76, and 78, in any of the horizontal adjustment apertures 52, 54, 56, and 58, the horizontal distance (i.e., the distance between the left and right upper contact rollers 22 and 24 and/or the distance between the left and right lower contact rollers 26 and 28) can be easily adjusted, thereby adjusting the locations in which the tensioning force is applied to a belt drive 12. This ability is useful for enhanced stability and optimization of drive belt life. Additionally, by adjustably securing any or all of the contact roller bearing axles 72, 74, 76, and 78, in any of the vertical adjustment apertures 62, 64, 66, and 68, the vertical distance (i.e., the distance between upper and lower left contact rollers 22 and 26 and/or the distance between upper and lower right contact rollers 24 and 28) is easily adjustable, thereby allowing for simple adjustability of the magnitude of tensioning force applied to the belt drive 12.

In the preferred embodiment of the present invention shown in FIGS. 1 and 2, there are two horizontal adjustment apertures 52, 54, 56, and 58, for each primary positional location aperture 42, 44, 46, and 48; and two vertical adjustment apertures 62, 64, 66, and 68 for each primary positional locating aperture 42, 44, 46, and 48. Other preferred embodiments of the present invention utilize both fewer and greater numbers of horizontal adjustment apertures and vertical adjustment apertures, without departing from the scope of the present invention. Further, in additional preferred embodiments of the present invention, the magnitude and spacing of the horizontal adjustment apertures and vertical adjustment apertures varies significantly, depending upon the amount of adjustability that is anticipated to be needed for the particular tensioning device application. Still other preferred embodiments of the present invention utilize adjustment apertures which are displaced both horizontally and vertically from the primary positional apertures, in accordance with the present invention.

Figure 3:
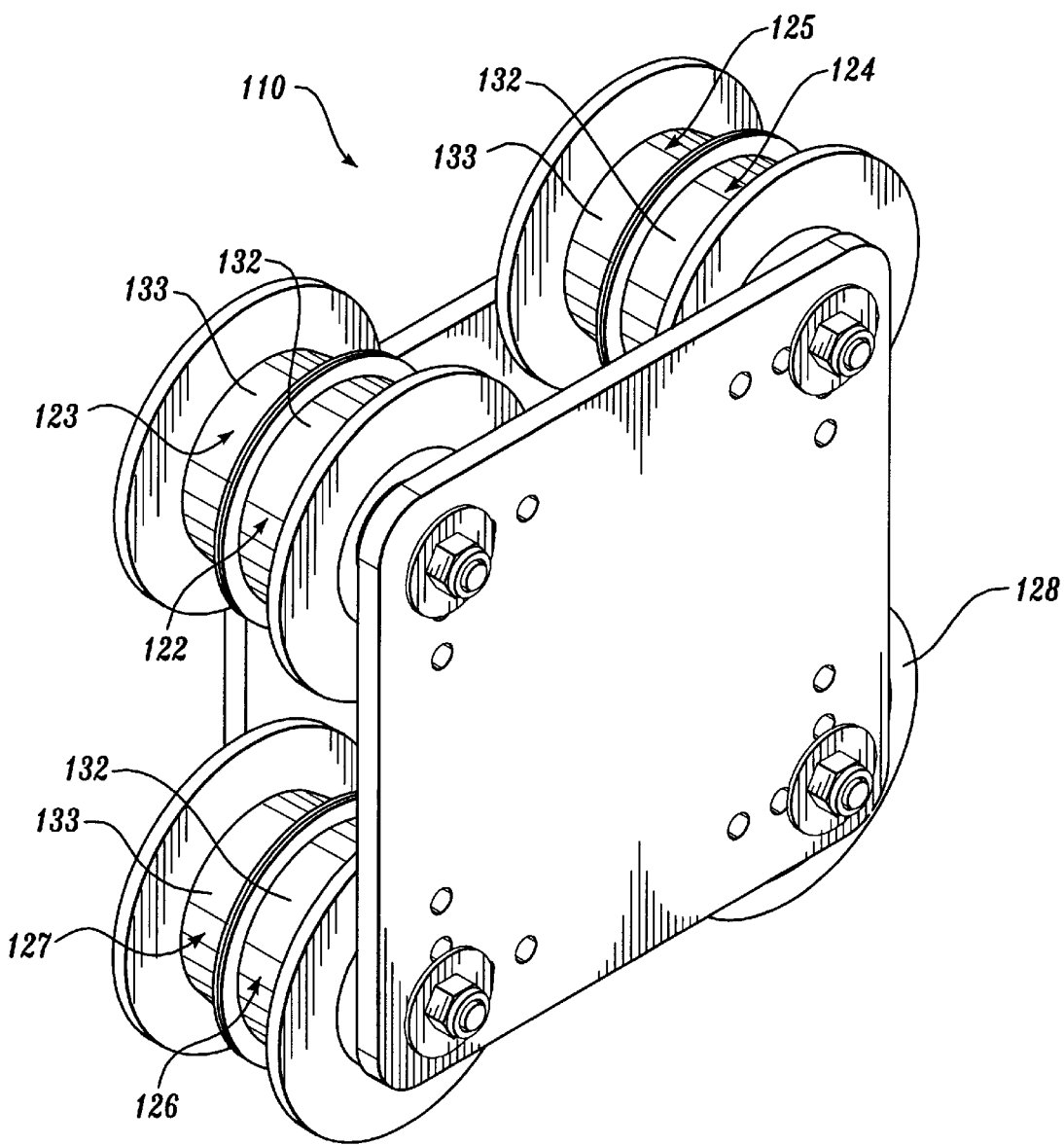
FIG. 3 illustrates an elevated perspective view of an alternate dual-adjustable belt idler of the present invention, configured for use with two belts.
Figure 4:
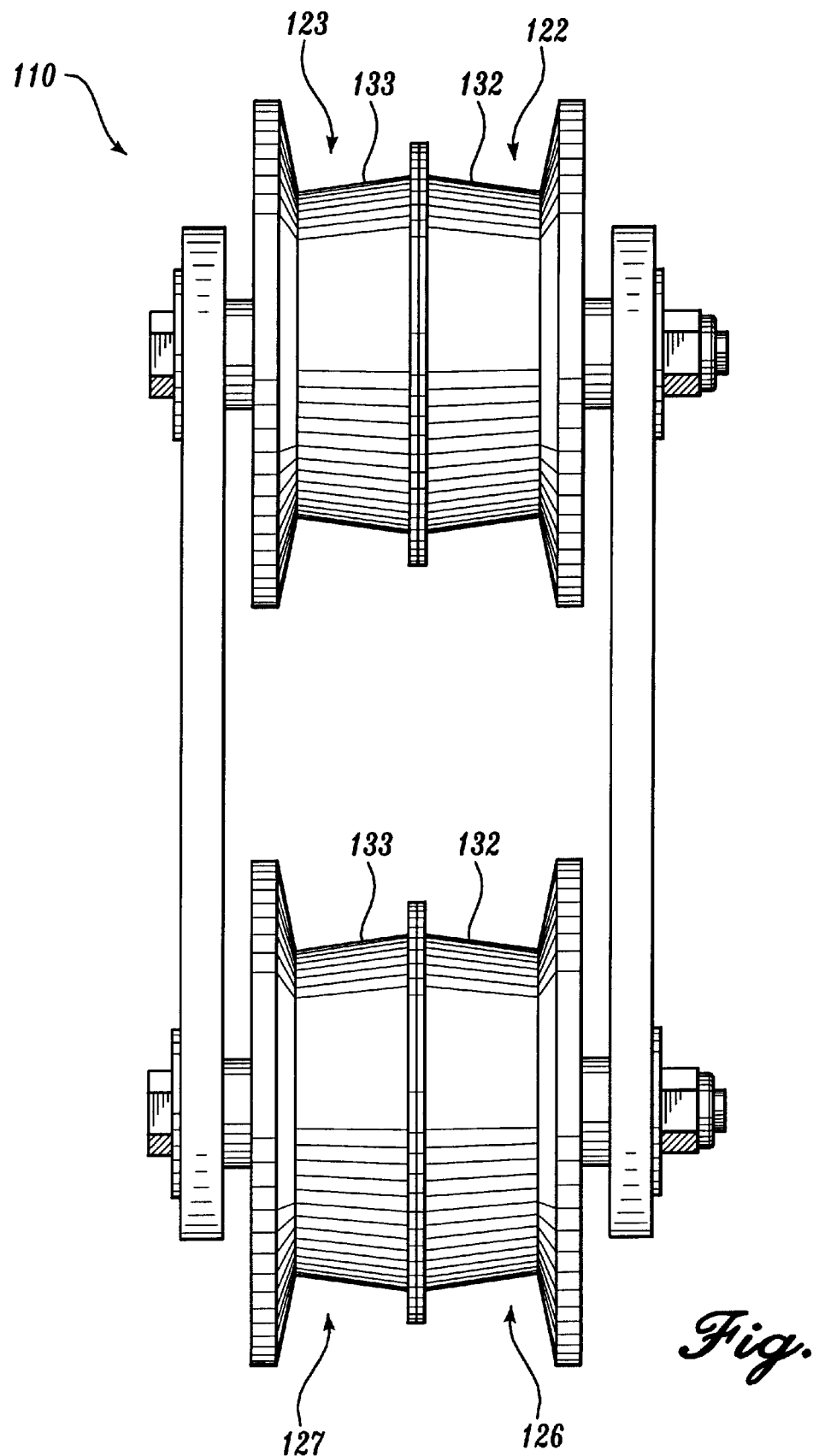
FIG. 4 illustrates a side view of the dual-adjustable belt idler of FIG. 3.

In the alternate preferred embodiment tensioning device 110, shown in FIGS. 3 and 4, an additional set of left and right, upper and lower, distal contact rollers 123, 125, 127, and 129 are employed in concert with left and right, upper and lower, proximal contact rollers 122, 124, 126, and 128. The set of distal contact rollers 123, 125, 127, and 129 are configured to tension an additional flexible drive element, while the proximal contact rollers 122, 124, 126, and 128 tension the original flexible drive element. The distal contact rollers 123, 125, 127, and 129 preferably are independently journalled from the proximal contact rollers 122, 124, 126, and 128. The distal contact rollers 123, 125, 127, and 129, are however preferably mounted on common bearing axles with the respective primary contact rollers, while maintaining independent bearing race assemblies.

As most clearly shown in FIG. 4, the bottom surfaces 132 (i.e., annular circumferential surfaces) of the proximal contact rollers, and the bottom surfaces 133 of the distal contact rollers are angled downwardly and outwardly, as opposed to being cylindrical as in the bottom surfaces 32 in the tensioning device 10 of FIGS. 1 and 2. As is further shown in FIG. 4, the proximal bottom surfaces 132 of the proximal contact rollers, and the distal bottom surfaces 133 of the distal contact rollers are preferably inversely angled from one another. The angle defined by each such surface is suitably 5° relative to the axis defined by the roller axle. This relative orientation of the bottom surfaces 132 and 133 provides enhanced stability in some multi-belt drive systems. Further, in other preferred embodiment tensioning devices, even larger numbers of contact roller sets are employed to correspond with multi-belt drive systems that utilize even larger numbers of drive belts (e.g., three belts, four belts, etc.). Preferably, when larger numbers of contact roller sets are utilized for a larger number of belt drive systems, the inverse relative angling of the bottom surfaces (such as is shown by surfaces 132 and 133 in FIG. 4) is maintained throughout the sets of contact rollers (such that the bottom surfaces would produce a serrated appearance when viewed from the side).

In another alternate preferred embodiment tensioning device 210, shown in FIGS. 5 and 6, the frame assembly 220 contains elongated rectangular frame sidewalls 238 and 240. This exemplary tensioning device 210 differs from the aforedescribed tensioning device 10, in that the alternate tensioning device 210 contains an additional upper contact roller 223 between the left and right upper contact rollers 222 and 224, and contains an additional lower contact roller 227 between left and right lower contact rollers 226 and 228.

These upper and lower intermediate contact rollers 223 and 227 provide additional stability and are especially useful with longer belt drives which have a tendency to cause an associated tensioning device to "flip".

The intermediate contact rollers 223 and 227 incorporate bearing axles 273 and 277 that are rotatably secured by bearing race assemblies 280, as in previously described embodiments. The intermediate upper and lower bearing axles 273 and 277 nest through upper and lower intermediate positional locating apertures 243 and 247, and are secured by washers 282 and nuts 284. As previously stated, other known securement mechanisms, which are known in the art, may be employed to attach the bearing axles 273 and 277 to the frame assembly 220, without departing from the scope of the present invention. As can be seen in FIGS. 5 and 6, the upper intermediate contact roller 223 secures in the upper intermediate positional locating aperture 243 slightly lower than the left and right upper contact rollers 222 and 224, while the lower intermediate contact roller 227 locates in the lower intermediate postional locating aperture 247 slightly higher than the left and right lower contact rollers 226 and 228.

As in previous embodiments, the bearing axles 273 and 277 of the upper and lower intermediate contact rollers 223 and 227 can also locate in any of the upper and lower intermediate horizontal adjustment apertures 253 and 257 and/or any of the upper and lower intermediate vertical adjustment apertures 263 and 267, thereby adjusting the selective securement locations of the upper and lower intermediate contact rollers 223 and 227 on the frame assembly 220. As previously stated with regard to other embodiments, the spacing and number of intermediate horizontal adjustment apertures and intermediate vertical adjustment apertures can be modified without departing from the scope of the present invention.

In the preferred embodiment tensioning device 210, the upper run 214 of the belt drive being tensioned can be guided above the upper intermediate contact roller 223 while the lower run 216 of the guide belt being tensioned is guided below the lower intermediate contact roller 227 as shown in FIG. 5. Alternatively, the upper run 214 of the belt drive being tensioned can be guided below the upper intermediate contact roller 223 while the lower run 216 of the belt drive being tensioned is guided above the lower intermediate contact roller 227 as shown in FIG. 6. In the interwoven style of tensioning of the belt drive shown in FIG. 5, the opposite side of the belt drive 212 is contacted by the intermediate contact rollers 223 and 227, than is contacted by the outer contact rollers 222, 224, 226, and 228.

This dual side belt drive contact can be of particular interest depending on the configuration of belt drive being tensioned. If a flat belt is being tensioned, then intermediate contact rollers 223 and 227 may be utilized that are identical to the outer contact rollers 222, 224, 226, and 228. However, should another configuration of belt drive such as a double-V drive belt 218 be the object of the tensioning device (as shown in FIG. 5), then upper and lower intermediate contact rollers 223 and 227 must be utilized that have correspondingly serrated circumferential surfaces 230 in order to properly mate in a secure fashion with the surface of the double-V belt drive 218. In the non-interwoven style of tensioning shown in FIG. 6, it is unimportant to the configuration of the tensioning device 210 if the lower surface of the upper run 214 and the upper surface of the lower run 216 are of a double-V or other nonflat configuration, since this portion of the drive belt does not make contact with the surface of any of the contact rollers 222, 223, 224, 226, 227, and 228.

The present invention has been described in relation to a preferred embodiment and alternate embodiments. One of ordinary skill after reading the foregoing specifications, may be able to affect various other changes, alterations, and substitutions or equivalents without departing from the concepts disclosed. It is therefore intended that the scope of the letters patent granted hereon be limited only by the definitions contained in the appended claims and equivalents thereof.

The embodiments of the invention in which an exclusive property or privilege is claimed are defined as follows:

1. A tensioning device for a drive system having at least one flexible drive element that includes first and second runs, the tensioning device comprising:
   a first set of at least two contact rollers, wherein each contact roller engages a first run of the flexible drive element to assist in guiding the drive element;
   a second set of at least two contact rollers, wherein each contact roller engages a second run of the flexible drive element to assist in guiding the drive element; and
   at least one connecting frame sidewall extending between the first and second set of at least two contact rollers for securing the first and second set of at least two contact rollers a selected distance from one another, and for adjustably securing the distance between the at least two contact rollers of the first set, and for adjustably securing the distance between the at least two contact rollers of the second set.

2. The tensioning device of claim 1, wherein the at least one connecting frame sidewall extends between the first and second set of at least two contact rollers for adjustably securing the first and second set of at least two contact rollers a selected distance from one another to apply a predetermined tensioning force to the drive element.

3. The tensioning device of claim 1, wherein the contact rollers each rotatably engage a flexible drive element, and comprise a U-shaped circumferential guide channel, the guide channel forming sidewalls in the contact rollers to assist in guiding the drive element.

4. The tensioning device of claim 1, wherein the at least one connecting frame sidewall is substantially rectangular in shape.

5. The tensioning device of claim 4, wherein the tensioning device is defined as horizontally mounted when the longer leg of the rectangular frame sidewall is substantially aligned with the runs of the flexible drive element, and the tensioning device is defined as vertically mounted when the shorter leg of the rectangular frame sidewall is substantially aligned with the runs of the flexible drive element, and the tensioning device is oriented in a position selected horizontally mounted and vertically mounted.

6. The tensioning device of claim 1, wherein the at least one connecting frame sidewall is substantially square in shape.

7. The tensioning device of claim 1, wherein the at least one connecting frame sidewall is a substantially flat plate.

8. The tensioning device of claim 1, wherein the at least one frame sidewall contains multiple positional locating apertures for each contact roller.

9. The tensioning device of claim 8, wherein the contact rollers are rotatably connected to the at least one frame sidewall by bearing axles that are secured through the positional locating apertures.

10. The tensioning device of claim 9, wherein the distance between the contact rollers is adjustable by selectively securing the bearing axles through the appropriate positional locating apertures that produce the desired spacing between the contact rollers.

11. The tensioning device of claim 8, wherein the outer edges of the at least one frame sidewall are substantially aligned with the multiple positional locating apertures.

12. The tensioning device of claim 1, further comprising additional sets of contact rollers that are configured to tension at least one more additional flexible drive element that includes at least first and second runs.

13. The tensioning device of claim 12, wherein the additional sets of contact rollers are independently journalled from the first and second sets of contact rollers.

14. The tensioning device of claim 12, wherein the first and second sets of contact rollers are rotatably connected to the at least one frame sidewall by bearing axles that are secured through positional locating apertures in the at least one frame sidewall, and the additional sets of contact rollers share the same bearing axles as the first and second sets of contact rollers.

15. The tensioning device of claim 1, wherein the contact rollers have angled surfaces that engage with the flexible drive element.

16. The tensioning device of claim 15, further comprising additional sets of contact rollers that are configured to tension at least one more additional flexible drive element, and wherein the additional sets of contact rollers have angled surfaces that engage with the at least one more additional flexible drive element, wherein the first and second sets of contact rollers have angled surfaces inversely juxtapositioned to the angled surfaces of the additional sets of contact rollers.

17. The tensioning device of claim 1, wherein at least one intermediate contact roller is secured to the at least one connecting frame sidewall approximately between the contact rollers of the first pair that engages a first run of the flexible belt drive to assist in stabilizing the belt drive, and at least one intermediate contact roller is secured to the at least one connecting frame sidewall approximately between the contact rollers of the second pair that engages a second run of the flexible belt drive to assist in stabilizing the belt drive.

18. The tensioning device of claim 17, wherein the intermediate contact rollers have surfaces that engage with the flexible drive element that are in a serrated configuration to correspondingly receive a saw tooth-shaped belt drive.

19. The tensioning device of claim 1, wherein the tensioning device is free floating on the flexible drive element.

20. A tensioning device for a drive system having a flexible belt drive that includes first and second runs, the tensioning device comprising:
   a first and second pair of contact rollers for engaging with the flexible belt drive, wherein the first pair of contact rollers engages a first run of the flexible belt drive to assist in guiding the belt drive and the second pair of contact rollers engages a second run of the flexible belt drive to assist in guiding the belt drive; and
   a frame assembly connecting the first and second pair of contact rollers to secure the first and second pair of contact rollers a selected distance from one, and for adjustably securing the distance between the contact rollers of the first pair, and for adjustably securing the distance between the contact rollers of the second pair.

21. The tensioning device of claim 20, wherein the frame assembly extends between the first and second pair of contact rollers for adjustably securing the first and second pair of contact rollers a selected distance from one another to apply a predetermined tensioning force to the drive element.

22. The tensioning device of claim 20, wherein the frame assembly is substantially rectangular in shape, and wherein the tensioning device is defined as horizontally mounted when the longer leg of the rectangular frame assembly is substantially aligned with the runs of the flexible drive element, the tensioning device is defined as vertically mounted when the shorter leg of the rectangular frame assembly is substantially aligned with the runs of the flexible drive element, and the tensioning device is oriented in a position selected horizontally mounted and vertically mounted.

23. The tensioning device of claim 20, wherein the frame assembly contains multiple positional locating apertures for each contact roller, wherein the contact rollers are rotatably connected to the frame assembly by bearing axles that are secured through the positional locating apertures, wherein the distance between the contact rollers is adjustable by selectively securing the bearing axles through the appropriate positional locating apertures that produce the desired spacing between the contact rollers.

24. The tensioning device of claim 20, further comprising additional sets of contact rollers that are configured to tension at least one more additional flexible drive element that includes at least first and second runs.

25. The tensioning device of claim 24, wherein the first and second sets of contact rollers are rotatably connected to the at least one frame sidewall by bearing axles that are secured through positional locating apertures in the at least one frame sidewall, and the additional sets of contact rollers share the same bearing axles as the first and second sets of contact rollers.

26. The tensioning device of claim 20, further comprising additional sets of contact rollers that are configured to tension at least one more additional flexible drive element, and wherein the additional sets of contact rollers have angled surfaces that engage with the at least one more additional flexible drive element, wherein the first and second sets of contact rollers have angled surfaces inversely juxtapositioned to the angled surfaces of the additional sets of contact rollers.

27. A free floating tensioning device for a drive system having a flexible belt drive, said tensioning device being mounted to float with the drive belt, the tensioning device comprising:
   a first and second set of at least two contact rollers for engaging with the flexible belt drive, each set including at least first and second contact rollers; and
   at least one connecting frame sidewall extending between the first and second set of at least two contact members for, securing the first and second set of at least two contact rollers a selected distance from one another, the frame sidewall constructed to define: a first frame portion extending between and aligned with the first roller of the first set and the first roller of the second set; a second frame portion extending between and aligned with the second roller of the first set and the second roller of the second set; a first spacing portion extending between the first and second roller of the first set; and a second spacing portion extending between the first and second rollers of the second set.

28. The tensioning device of claim 27, wherein the frame assembly extends between the first and second pair of contact rollers for adjustably securing the first and second pair of contact rollers a selected distance from one another to apply a predetermined tensioning force to the drive element.

29. The tensioning device of claim 27, wherein the frame assembly is substantially rectangular in shape, and wherein the tensioning device is defined as horizontally mounted when the longer leg of the rectangular frame assembly is substantially aligned with the runs of the flexible drive element, the tensioning device is defined as vertically mounted when the shorter leg of the rectangular frame assembly is substantially aligned with the runs of the flexible drive element, and the tensioning device is oriented in a position selected horizontally mounted and vertically mounted.

30. The tensioning device of claim 27, wherein the frame assembly contains multiple positional locating apertures for each contact roller, wherein the contact rollers are rotatably connected to the frame assembly by bearing axles that are secured through the positional locating apertures, wherein the distance between the contact rollers is adjustable by selectively securing the bearing axles through the appropriate positional locating apertures that produce the desired spacing between the contact rollers.

31. The tensioning device of claim 27, further comprising additional sets of contact rollers that are configured to tension at least one more additional flexible drive element that includes at least first and second runs.

32. The tensioning device of claim 31, wherein the first and second sets of contact rollers are rotatably connected to the at least one frame sidewall by bearing axles that are secured through positional locating apertures in the at least one frame sidewall, and the additional sets of contact rollers share the same bearing axles as the first and second sets of contact rollers.

33. The tensioning device of claim 27, further comprising additional sets of contact rollers that are configured to tension at least one more additional flexible drive element, and wherein the additional sets of contact rollers have angled surfaces that engage with the at least one more additional flexible drive element, wherein the first and second sets of contact rollers have angled surfaces inversely juxtapositioned to the angled surfaces of the additional sets of contact rollers.

34. A tensioning device for a drive system having a flexible belt drive that includes first and second runs, the tensioning device comprising:
   a first and second pair of contact rollers for engaging with the flexible belt drive, wherein the first pair of contact rollers engages a first run of the flexible belt drive to assist in guiding the belt drive and the second pair of contact rollers engages a second run of the flexible belt drive to assist in guiding the belt drive;
   at least one connecting frame sidewall extending between the first and second pair of contact rollers for securing the first and second pair of contact rollers a selected distance from one another to apply a predetermined tensioning force to the drive element; and
   at least one intermediate contact roller secured to the at least one connecting frame sidewall between the contact rollers of the first pair that engages a first run of the flexible belt drive to assist in stabilizing the belt drive, and at least one intermediate contact roller secured to the at least one connecting frame sidewall between the contact rollers of the second pair that engages a second run of the flexible belt drive to assist in stabilizing the belt drive.

35. The tensioning device of claim 34, wherein the intermediate contact rollers have surfaces that engage with the flexible drive element that are in a serrated configuration to correspondingly receive a saw tooth-shaped belt drive.

36. The tensioning device of claim 34, wherein the intermediate contact rollers have surfaces that engage with the flexible drive element that are substantially planer in configuration to correspondingly receive a substantially flat belt drive.

* * * * *

UNITED STATES PATENT AND TRADEMARK OFFICE
CERTIFICATE OF CORRECTION

PATENT NO. : 6,179,740 B1 Page 1 of 1
DATED : January 30, 2001
INVENTOR(S) : H.F. Walker It is certified that error appears in the above-identified patent and that said Letters Patent is hereby corrected as shown below:

Column 10,
Line 56 (Claim 20, line 12) "one," should read -- one another, --

Column 11,
Line 47 (Claim 27, line 10) "for, securing" should read -- for securing --
Line 55 (Claim 27, line 18) "first and second roller" should read -- first and second rollers --

Column 12,
Line 63 (Claim 36, line 3) "planer" should read -- planar --

Signed and Sealed this

Twenty-third Day of October, 2001

Attest:

NICHOLAS P. GODICI
Attesting Officer    Acting Director of the United States Patent and Trademark Office